(12) United States Patent
Mochizuki et al.

(10) Patent No.: US 12,539,277 B2
(45) Date of Patent: Feb. 3, 2026

(54) PRODUCTION METHOD FOR MICROCAPSULE, AND COATING LIQUID

(71) Applicant: FUJIFILM Corporation, Tokyo (JP)

(72) Inventors: Yusuke Mochizuki, Ashigarakami-gun (JP); Ryuta Takegami, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1009 days.

(21) Appl. No.: 17/497,289

(22) Filed: Oct. 8, 2021

(65) Prior Publication Data

US 2022/0023226 A1 Jan. 27, 2022

Related U.S. Application Data

(63) Continuation of application No. PCT/JP2020/015757, filed on Apr. 8, 2020.

(30) Foreign Application Priority Data

Apr. 9, 2019 (JP) .................................. 2019-073936

(51) Int. Cl.
| | |
|---|---|
| *A61K 9/50* | (2006.01) |
| *A61K 35/28* | (2015.01) |
| *A61K 38/28* | (2006.01) |
| *A61K 47/36* | (2006.01) |

(52) U.S. Cl.
CPC .......... *A61K 9/5089* (2013.01); *A61K 9/5031* (2013.01); *A61K 35/28* (2013.01); *A61K 38/28* (2013.01); *A61K 47/36* (2013.01)

(58) Field of Classification Search
None
See application file for complete search history.

(56) References Cited

U.S. PATENT DOCUMENTS 6,165,503 A * 12/2000 Gaserod .................. B01J 13/02
424/463
2006/0228422 A1 10/2006 Sava et al.

FOREIGN PATENT DOCUMENTS

| JP | 60-258121 A | 12/1985 |
|---|---|---|
| JP | 2002-511796 A | 4/2002 |
| WO | WO 91/09119 A1 | 6/1991 |

OTHER PUBLICATIONS

Safley, S. A. et al., Biocompatibility and immune acceptance of adult porcine islets transplanted intraperitoneally in diabetic NOD mice, Journal of Diabetes Science and Technology, Sep. 2008, vol. 2, 760-767 (Year: 2008).*
Attia, N. et al., Behaviour and ultrastructure of human bone marrow-derived mesenchymal stem cells immobilised in alginate-poly-l-lysine-alginate microcapsules, Apr. 25, 2014, Journal of Microencapsulation, vol. 31, 579-589 (Year: 2014).*
Weber, C.J. et al., Long-term survival of poly-L-lysine-alginate microencapsulated islet xenografts in spontaneously diabetic NOD mice, 1999, In: Cell Encapsulation Technology and Therapeutics, Birkhäuser, Boston, MA. https://doi.org/10.1007/978-1-4612-1586-8_11 (Year: 1999).*
Maeno, S. et al., The effect of calcium ion concentration on osteoblast viability, proliferation, and differentiation in monolayer and 3D culture, Biomaterials, 2005, vol. 26, 4847-4855 (Year: 2005).*
"Hanks' Balanced Salts [HBSS]," Sigma-Aldrich, May 2007, 1 page.
Extended European Search Report for corresponding European Application No. 20787695.4, dated May 2, 2022.
Loh et al., Combinatorial effect of different alginate compositions, polycations, and gelling ions on microcapsule properties, Colloid Polym Sci, vol. 290, 2012 (Published online Jan. 6, 2012), pp. 619-629.
Safley et al., "Biocompatibility and Immune Acceptance of Adult Porcine Islets Transplanted intraperitoneally in Diabetic NOD Mice in Calcium Alginate Poly-L-lysine Microcapsules versus Barium Alginate Microcapsules without Poly-L-lysine," Journal of Diabetes Science and Technology, vol. 2, Issue 5, Sep. 2008, pp. 760-767.
Strand et al., "Alginate-polylysine-alginate microcapsules: effect of size reduction on capsule properties," J. Microencapsulation, vol. 19, No. 5, 2002, pp. 615-630.
Uludag et al., "Technology of mammalian cell encapsulation," Advanced Drug Delivery Reviews, vol. 42, 2000, pp. 29-64.
Japanese Notice of Reasons for Refusal for corresponding Japanese Application No. 2021-513658, dated Oct. 4, 2022, with an English translation.
International Preliminary Report on Patentability and English translation of the Written Opinion of the International Searching Authority (Forms PCT/IB/326, PCT/IB/373 and PCT/ISA/237) for International Application No. PCT/JP2020/015757, dated Oct. 21, 2021.
International Search Report (Form PCT/ISA/210) for International Application No. PCT/JP2020/015757, dated Jun. 23, 2020, with English translation.

(Continued)

*Primary Examiner* — Bethany P Barham
*Assistant Examiner* — Paul Hoerner
(74) *Attorney, Agent, or Firm* — Birch, Stewart, Kolasch & Birch, LLP (57) ABSTRACT

There is provided a production method for a microcapsule in which cells are encapsulated with alginic acid and a polycation, the method including dropwise adding a cell suspension containing cells and alginic acid into a calcium ion-containing solution to obtain a liquid droplet in which the cells are encapsulated in alginic acid, and immersing the liquid droplet in a coating liquid containing a polycation, to obtain the microcapsule, where the coating liquid contains a calcium ion or a barium ion at a concentration of 0.1 mM or more and 50.0 mM or less. According to the production method of the present invention, it is possible to produce a microcapsule having a uniform shape and particle size.

17 Claims, 2 Drawing Sheets

(56) References Cited

OTHER PUBLICATIONS

Safley et al., "Microencapsulated adult porcine islets transplanted intraperitoneally in streptozotocin-diabetic non-human primates," Xenotransplantation, 2018 (Accepted Jun. 26, 2018), pp. 1-24.
Schneider et al., "Long-Term Graft Function of Adult Rat and Human Islets Encapsulated in Novel Alginate-Based Microcapsules After Transplantation in Immunocompetent Diabetic Mice," Diabetes, vol. 54, Mar. 2005, pp. 687-693.

* cited by examiner

| COMPARATIVE EXAMPLE 1 | EXAMPLE 1 | EXAMPLE 2 |
|---|---|---|
| 0 mM | 0.2 mM | 2.0 mM |
|  |  |  |

| EXAMPLE 3 | EXAMPLE 4 | COMPARATIVE EXAMPLE 2 |
|---|---|---|
| 10 mM | 50 mM | 100 mM |
|  |  |  |

PRODUCTION METHOD FOR MICROCAPSULE, AND COATING LIQUID

CROSS-REFERENCE TO RELATED APPLICATIONS

This application is a continuation of PCT International Application No. PCT/JP2020/015757 filed on Apr. 8, 2020, which claims priority under 35 U.S.C § 119 (a) to Japanese Patent Application No. 2019-073936 filed on Apr. 9, 2019, the entire content of which is incorporated herein by reference.

BACKGROUND OF THE INVENTION

1. Field of the Invention

The present invention relates to a production method for a microcapsule, and a coating liquid that is used for producing a microcapsule.

2. Description of the Related Art

Research has been carried out on a method of microencapsulating tissues or cells using a biocompatible material and transplanting them (for example, JP1985-258121A (JP-S60-258121A)).

JP1985-258121A (JP-S60-258121A) describes that a liquid droplet formed from a suspension of pancreatic islet, containing alginic acid, is incubated in a solution of polylysine having a molecular weight of 17,000 to produce a microcapsule.

In addition, in pancreatic islet transplantation, which is expected as a radical treatment for diabetes, research has been actively carried out on the pancreatic islet transplantation using heterologous pancreatic islet as a countermeasure against a shortage of donors. However, the realization of the heterologous pancreatic islet transplantation requires the protection of the pancreatic islet from the immune rejection to the heterologous transplantation. Studies on a membrane for immunoisolation using a hydrogel and the like are underway as a countermeasure against immune rejection in cell transplantation, which is not limited to the pancreatic islet transplantation. It is described that cells are immunoisolated with an alginate capsule in Diabetes. 54 (3): 687-693 (2005).

SUMMARY OF THE INVENTION

When the inventors of the present invention produced a microcapsule by the method described in JP1985-258121A (JP-S60-258121A) and checked the performance thereof, a case where the immunoisolation function was insufficient was observed. This was presumed to be because the immunoisolation function was not uniform since it was observed that the shape of some of the obtained microcapsules was deformed and that the particle size was not uniform.

In consideration of the above circumstances, an object of the present invention is to provide a method with which a microcapsule having a uniform shape and particle size can be produced, as a production method for a microcapsule in which cells are encapsulated.

The inventors of the present invention have carried out diligent studies to solve the above problems and have found that in the method described in JP1985-258121A (JP-S60-258121A), in a case where a calcium or a barium ion is added to a coating liquid containing polylysine, with which a liquid droplet formed from a suspension containing cells and alginic acid is treated, the uniformity of the obtained microcapsule is improved. The present invention has been completed based on the above findings.

That is, according to the present invention, the following <1> to <13> are provided.

<1> A production method for a microcapsule in which cells are encapsulated with alginic acid and a polycation, the method comprising:
dropwise adding a cell suspension containing alginic acid and the cells into a calcium ion-containing solution to obtain a liquid droplet in which the cells are encapsulated with alginic acid; and
immersing the liquid droplet in a coating liquid containing a polycation to obtain the microcapsule,
in which the coating liquid contains a calcium ion or a barium ion at a concentration of 0.1 mM or more and 50.0 mM or less.

<2> The production method according to <1>, in which the cell suspension has a viscosity of 50 mPa·s or more and 500 mPa·s or less.

<3> The production method according to <1> or <2>, in which the molecular weight of the polycation is 1 kDa or more and 200 kDa or less.

<4> The production method according to <1> or <2>, in which the molecular weight of the polycation is 1 kDa or more and 50 kDa or less.

<5> The production method according to any one of <1> to <4>, in which the polycation is poly-L-lysine or poly-L-ornithine.

<6> The production method according to any one of <1> to <5>, in which the coating liquid in which the liquid droplet is immersed is subjected to shaking treatment.

<7> The production method according to any one of <1> to <6>, further comprising immersing the microcapsule in a solution containing alginic acid.

<8> The production method according to <7>, in which the microcapsules after being immersed in the solution containing alginic acid are dispersed in a solution containing a calcium ion or barium ion at a concentration of 0.1 mM or more and 50.0 mM or less.

<9> The production method according to any one of <1> to <8>, in which the cell is a cell that releases a physiologically active substance.

<10> The production method according to <9>, in which the physiologically active substance is insulin.

<11> The production method according to <9> or <10>, in which the cell is a cell in a pancreatic islet.

<12> The production method according to any one of <9> to <11>, in which in the microcapsule, a mesenchymal stem cell or a mesenchymal stem cell group is encapsulated with alginic acid and a polycation together with the cell.

<13> A coating liquid that is used in the method according to any one of <1> to <12>, the coating liquid comprising the polycation of which a molecular weight is 5 kDa or more and 50 kDa or less; and a calcium ion or barium ion at a concentration is 0.1 mM or more and 50.0 mM.

The present invention provides a production method for a microcapsule in which cells are encapsulated, which is a method with which a microcapsule having a uniform shape and particle size can be produced. Since a microcapsule produced by the production method of the present invention has a uniform shape and particle size, the microcapsule is hardly broken and has high storage stability. In addition, the microcapsule produced by the production method of the present invention is suitable for use application in transplanting cells into a recipient.

DESCRIPTION OF THE PREFERRED EMBODIMENTS

Hereinafter, embodiments for carrying out the present invention will be described in detail. In the present specification, "to" denotes a range including numerical values described before and after "to" as a minimum value and a maximum value, respectively.

In the present specification, the molecular weight means the weight-average molecular weight measured by gel permeation chromatography (GPC), and specifically, it is sufficient that the molecular weight is measured under the following analytical conditions.

Device: HLC-8220GPC, manufactured by TOSOH Corporation
Column: TSKGEL G5000PWXL, G4000PWXL, or G2500PWXL
Eluent: 200 mM sodium nitrate aqueous solution
Flow rate: 1.0 mL/min
Temperature: 40° C.
Detector: differential refractometer (RI)

For the calculation of the molecular weight, the standard pullulan samples, Shodex Pullulan P-5, P-10, P-20, P-50, P-82, P-100, P-200, P-400, P-800, and P-1600 were used.

<Microcapsule>

It is sufficient that the microcapsule is a spherical or substantially spherical particle. The microcapsule produced by the production method of the present invention contains alginic acid and a polycation, with which cells are encapsulated. It is preferable that the microcapsule produced by the production method of the present invention has a core containing cells and a shell containing alginic acid and a polycation. The microcapsule may contain a protein such as albumin, a peptide, a pH buffer, an inorganic salt, and the like, which are necessary for cell maintenance.

The microcapsule is usually a particle having a size equivalent to that of a sphere having a diameter of 100 μm to 8,000 μm and preferably a diameter of 300 μm to 3,000 μm; however, the size thereof is not particularly limited. That is, the "micro" of the microcapsule has no particular meaning for limiting the size.

The microcapsule preferably has an immunoisolation function. The immunoisolation is a method for preventing immune rejection. In general, the immunoisolation is one of the methods for preventing the recipient's immune rejection at the time of transplantation. Here, the immune rejection is the recipient's rejection of cells in a case where these cells are transplanted. By the immunoisolation, cells are isolated from the recipient's immune rejection. Examples of the immune rejection include the immune rejection based on the cell-mediated immune response and the immune rejection based on the humoral immune response.

In the microcapsule, in a case where the concentration of alginic acid or the thickness of the polycation coat is adjusted, the permeability of a substance can be adjusted, and for example, it is possible to suppress the permeation of a substance of 150 kDa or more.

[Alginic Acid]

The microcapsule contains alginic acid. More specifically, it is sufficient that the microcapsule contains a gel formed by cross-linking alginic acid. In a case where the conditions for forming an alginic acid solution or the composition of the solution are adjusted, the alginic acid can be made into a cross-linked hydrogel. Methods of encapsulating cells in alginic acid and microencapsulating them are known, and those known methods can be appropriately referenced and used in the formation of a liquid droplet in the production method of the present invention.

Alginic acid is a block copolymer composed of glucuronic acid (G) and mannuronic acid (M). Alginic acid is naturally present as a cell wall-constituting polysaccharide or an intercellular filling substance of brown algae and can be collected using these as a raw material. Specific examples of the raw material brown algae include brown algae of the order Fucales, family Durvillaeaceae, genus *Durvillaea* (for example, *D. potatorum*), the order Fucales, family Fucaceae, genus *Ascophyllum* (for example, *A. nodosum*), the order Laminariales, family Laminariaceae, genus *Saccharina* (for example, *Saccharina japonica* and *Saccharina longissima*), the order Laminariales, family Lessoniaceae, genus *Eisenia* (for example, *Eisenia bicyclis*), the order Laminariales, family Lessoniaceae, genus *Ecklonia* (for example, *Ecklonia cava* and *Ecklonia Kurome*), and the order Laminariales, family Lessoniaceae, genus *Lessonia* (for example, *L. flavikans*). Alternatively, commercially available alginic acid can be used.

The content of an endotoxin that may be contained in alginic acid (the alginic acid raw material that is used in the production method of the present invention) derived from the above-described raw material is preferably 1,000 EU/g or less, more preferably 500 EU/g or less, and still more preferably 100 EU/g or less.

About 50% of the content of an endotoxin of the alginic acid raw material is reflected as the content in the microcapsule. That is, the endotoxin content of the microcapsules is preferably 500 EU/g or less, more preferably 250 EU/g or less, and still more preferably 50 EU/g or less.

The endotoxin content can be measured using any one of the gelation method, the turbidimetry method, or the colorimetric method.

The G/M ratio of alginic acid is not particularly limited; however, since the larger the G/M ratio, the greater the gel-forming ability, the G/M ratio is preferably large. Specifically, it is preferably 0.8 to 2.0 and more preferably 0.8 to 1.6.

It is presumed that a polyvalent metal cation invades the pocket structure included in the M block to form an egg box, whereby alginic acid is gelated. In the production method of the present invention, it is sufficient that a microcapsule in which cells are encapsulated is formed by utilizing this gelation. Specific examples of the polyvalent metal cation that can cause gelation of alginic acid include a divalent or trivalent ion of a metal such as calcium (Ca), barium (Ba), aluminum (Al), magnesium (Mg), copper (Cu), strontium (Sr), cadmium (Cd), zinc (Zn), nickel (Ni), cobalt (Co), manganese (Mn), iron (Fe), or tin (Sn). Among the above, a calcium ion, a magnesium ion, a barium ion, or a strontium ion is preferable, and a calcium ion is more preferable.

That is, alginic acid may be in the form of alginate in the microcapsule. In addition, alginate may be used as an alginic acid raw material with which the microcapsule is formed. Here, preferred examples of the alginate include sodium alginate.

Further, alginic acid may be an alginic acid derivative. Regarding the alginic acid derivative, U.S. Pat. No. 9,422, 373B can be referred to.

The molecular weight of alginic acid is preferably 50 kDa or more, more preferably 100 kDa or more, and still more preferably 150 kDa or more.

[Polycation]

The microcapsule produced by the production method of the present invention further contains a polycation (an organic polymer compound having a cation residue). In the microcapsule, alginic acid preferably further forms a polyion complex gel together with a polycation. For example, in a case where a hydrogel formed by ionically cross-linking alginic acid with a divalent cation further comes into contact with a polycation, a semi-permeable membrane can be formed. At this time, in general, a microcapsule having an inner shell made of an alginic acid gel and an outer shell containing a polycation is formed. This microcapsule may further have an additional outermost layer shell (for example, an envelope). For example, in a case where an additional outermost layer shell is formed of an alginic acid gel, the surface charge can be reduced. Specifically, a multi-layer microcapsule of "an alginic acid gel/a polycation-alginic acid gel/an alginic acid gel/cells" may be formed.

Here, the polyion complex state refers to a state in which an organic polymer compound having a cation residue and an organic polymer compound having an anion residue form a complex by electrostatic interaction.

Examples of the polycation include a polymer having a basic reactive group such as an amine group or an imine group. Specific examples thereof include polyornithine (poly-L-ornithine), polylysine (poly-L-lysine), chitosan, gelatin, collagen, polyethyleneimine, poly(vinylamine), and poly(allylamine), as well as polycations described in paragraph 0069 of US2009/0214660 A1. Among these, polyornithine or polylysine is preferable, and polyornithine is more preferable. The molecular weight of the polycation may be 0.2 kDa or more and 500 kDa or less, preferably 0.5 kDa or more and 300 kDa or less, and more preferably 1 kDa or more and 200 kDa or less. In particular, in a case where the molecular weight of the polycation is set to 1 kDa or more, it is possible to sufficiently cross-link alginic acid and the polycation and prevent swelling. Further, in a case where the molecular weight of the polycation is set to 200 kDa or less, it is possible to prevent cross-linking between capsules and carry out uniform coating. The molecular weight of the polycation is particularly preferably 5 kDa or more and 50 kDa or less.

Regarding the alginic acid hydrogel cross-linked with a polycation, Journal of biomedical materials research Part B 101B 258-268 (2013) can be referred to.

[Cell]

The cell that is encapsulated in the microcapsule produced by the production method of the present invention may be one cell or a plurality of cells; however, a plurality of cells is preferable. The plurality of cells may be separated from each other or may be an aggregate.

The cell may be a cell obtained directly from a living body or may be a cell obtained by inducing differentiation of a cell such as an embryonic stem cell (an ES cell), an induced pluripotent stem cell (an iPS cell), and a mesenchymal stem cell. The cell may be a progenitor cell.

As one aspect, the cell is preferably a cell that releases a physiologically active substance. Examples of the cell that releases a physiologically active substance include a pancreatic islet cell, a mesenchymal stem cell, a dopamine-producing nerve cell, a blood coagulation factor-secreting cell, and an α-Gal-producing cell. Examples of the physiologically active substance include various hormones, various cytokines, various enzymes, and various other factors in the living body. More specific examples thereof include insulin, dopamine, factor VIII, and the like. In the method of the present invention, since a physiologically active substance is sustainedly released and is difficult to be recognized by the immune system of the body which undergoes transplantation due to the fact that cells releasing the physiologically active substance are encapsulated in the uniform microcapsule and then transplanted, the method of the present invention is preferably applied to cells that release a physiologically active substance.

Here, insulin is a polypeptide (having a molecular weight of about 6,000) in which an A chain of 21 amino acid residues and a B chain of 30 amino acid residues are linked through a disulfide bond. In the living body of a mammal, insulin is secreted from β cells present in the islet of Langerhans in the pancreas. In a case where insulin-secreting cells are used as biological constituents in the present invention, the insulin secreted may be human insulin or other mammalian (for example, porcine) insulin. The insulin may be insulin produced by a genetic recombination method. Regarding the method of obtaining genetically recombinated insulin, for example, the description in Diabetes Navigator; edited by Takashi Kadowaki (pages 270 to 271, Ken Tao, Yoshikazu Oka "Current and Future Insulin Pharmaceutical Preparations", Medical Review Co., Ltd., 2002) can be referenced. Various insulin analogs (see, for example, H. C. Lee, J. W. Yoon, et al., Nature, Vol. 408, pp. 483-488, 2000) may be used.

(Insulin-Secreting Cell)

The cells contained in the microcapsule produced by the production method of the present invention are preferably insulin-secreting cells. The insulin-secreting cells are cells that can secrete insulin in response to the change in blood glucose level. The insulin-secreting cells are not particularly limited, and examples thereof include pancreatic cells present in the islet of Langerhans in the pancreas. The pancreatic β cells may be human pancreatic β cells or may be porcine, murine, or other pancreatic β cells. Regarding the method of extracting pancreatic β cells from a pig, the description in JP2007-195573A can be referenced. In addition, the insulin-secreting cells may be cells induced from human stem cells (see, for example, Junichi Miyazaki, Regenerative medicine, Vol. 1, No. 2, pp. 57-61, 2002) or cells induced from small intestinal epithelial stem cells (see, for example, Mineko Fujimiya et al., Regenerative medicine, Vol. 1, No. 2, pp. 63-68, 2002), or may be insulin-secretary cells into which a gene encoding insulin is incorporated (see, for example, H. C. Lee, J. W. Yoon, et al., Nature, Vol. 408, pp. 483-488, 2000).

The insulin-secreting cells may be a cell aggregate. In the present specification, the cell aggregate means a cell aggregate in which a plurality of cells are aggregated and do not correspond to a cell structure described later. An example of the cell aggregate is a pancreatic islet. That is, it is also preferable to use the pancreatic islet as insulin-secreting cells (see, for example, Hiroshi Hori, Kazutomo Inoue, Regenerative medicine, Vol. 1, No. 2, pp. 69-77, 2002).

The microcapsule may contain a plurality of kinds of cells. For example, one kind of cells and further another kind of cells that assist the function of the one kind of cells may be contained together.

Examples of such an example include an example in which insulin-secreting cells and mesenchymal stem cells are encapsulated in the microcapsule.

(Mesenchymal Stem Cell)

The mesenchymal stem cell (MSC) is a somatic stem cell present in the mesenchymal tissue and has an ability to differentiate into a cell belonging to the mesenchymal tissue. The mesenchymal tissue refers to tissue such as bone, cartilage, adipose, blood, bone marrow, skeletal muscle, dermis, ligament, tendon, or heart. The mesenchymal stem cell is more preferably an adipose-derived mesenchymal stem cell or a bone marrow-derived mesenchymal stem cell and still more preferably an adipose-derived mesenchymal stem cell.

The microcapsule produced by the production method of the present invention may contain mesenchymal stem cells as a mesenchymal stem cell group. The mesenchymal stem cell group means a group in which a plurality of mesenchymal stem cells are integrated. The mesenchymal stem cell group is preferably a cell aggregate or cell structure of mesenchymal stem cells and more preferably a cell structure thereof.

In the present specification, the cell structure means a structure including a polymer block having biocompatibility and cells, and a plurality of the polymer blocks are arranged in gaps between the plurality of the cells. In a case where the microcapsule produced by the production method of the present invention contains mesenchymal stem cells, it is preferable to contain a cell structure including a polymer block having biocompatibility and mesenchymal stem cells, where in the cell structure, a plurality of the polymer blocks are arranged in gaps between the plurality of mesenchymal stem cells.

In the cell structure, in a case where a plurality of polymer blocks, using polymer blocks having biocompatibility and cells, are three dimensionally arranged in the mosaic pattern in the gaps between a plurality of cells, the polymer block having biocompatibility and the cells are three dimensionally arranged in the mosaic pattern, and thus a cell three-dimensional structure in which the cells are uniformly present in the structure is formed.

In the cell structure, a plurality of polymer blocks are arranged in the gaps between a plurality of cells. However, here, the "cell gap" needs not to be a space closed by the constituent cells, and it is sufficient that it is sandwiched between cells. Gaps need not be present between all cells, and there may be places where cells are in contact with each other. The distance of the cell gap interposed by the polymer block, that is, the gap distance between a certain cell and a cell that is present at the shortest distance from the cell is not particularly limited; however, the distance is preferably a distance of the size of the polymer block, and the suitable distance is also a distance in the range of the suitable size of the polymer block.

Further, although the polymer block has a configuration sandwiched between cells, it is not necessary that cells are present between all the polymer blocks, and there may be a place where the polymer blocks are in contact with each other. The distance between the polymer blocks interposed by the cell, that is, the distance between polymer blocks in a case where a certain polymer block and a polymer block that is present at the shortest distance from the certain polymer block are selected is not particularly limited; however, the distance is preferably a distance of a size of a cell mass formed by aggregation of one to several cells to be used, and for example, it is 10 μm or more and 1,000 μm or less, preferably 10 μm or more and 100 μm or less, and more preferably 10 μm or more and 50 μm or less.

The polymer constituting the polymer block having biocompatibility is not particularly limited as long as it has the biocompatibility to the living body, and it is not particularly limited whether or not the polymer is degraded in the living body; however, the polymer is preferably composed of a biodegradable material. Specifically, the biodegradable material is at least one material selected from the group consisting of a polypeptide, a polylactic acid, a polyglycolic acid, polylactic acid-co-glycolic acid (PLGA), hyaluronic acid, glycosaminoglycan, proteoglycan, chondroitin, cellulose, agarose, carboxymethyl cellulose, chitin, and chitosan. Among the above, a polypeptide is particularly preferable. The kind of the polypeptide is not particularly limited as long as the polypeptide has biocompatibility; however, for example, gelatin, collagen, elastin, fibronectin, ProNectin, laminin, tenascin, fibrin, fibroin, entactin, thrombospondin, or RetroNectin is preferable, and gelatin, collagen, or atelocollagen is most preferable. As the gelatin to be used in the present invention, a natural gelatin or a recombinant gelatin is preferable. A recombinant gelatin is more preferable.

Details and preferred embodiments of the cell structure are described in WO2011/108517A, JP2014-12114A, WO2014/133081A, JP2015-134193A, and WO2015/190430A, and all the contents of the above documents shall be incorporated in the present specification by reference.

<Production Method for Microcapsule>

The production method for a microcapsule of the present invention includes dropwise adding a cell suspension containing cells and alginic acid into a calcium ion-containing solution to obtain a liquid droplet in which the cells are encapsulated in alginic acid, and immersing the liquid droplet in a coating liquid containing a polycation.

The cell suspension containing cells and alginic acid is formed by adding an alginic acid solution to cells (for example, cells in a buffer solution). Mixing is preferably carried out by a stirring method having a small shearing force so that the cells are not damaged.

The cell suspension is preferably prepared using a physiological saline solution or a buffer solution that is generally used for cell treatment. Examples of the buffer solution include a 3-morpholinopropane sulfonic acid (MOPS) buffer solution, a citric acid buffer solution, a Tris buffer solution, a Hepes buffer solution, and phosphate buffered saline (PBS).

It is sufficient that the mixing is performed by pipetting, transferring from one container to another container, or the like. A commercially available stirrer (for example, Awatori Rentaro (manufactured by THINKY Corporation)) may be used.

The concentration of cells in the cell suspension is preferably 1,000 cells/mL to 500,000 cells/mL and more preferably 5,000 cells/mL to 300,000 cells/mL.

The cell suspension preferably has a viscosity of 50 mPa·s or more and 500 mPa·s or less. In this range, it is easy to obtain a liquid droplet that is particularly difficult to be broken and that is uniform. It is sufficient that alginic acid has such a concentration that the above viscosity is obtained. For example, it is sufficient that the cell suspension contains about 1.3% by mass to 10% by mass of sodium alginate. The cell suspension more preferably has a viscosity of 100 mPa·s or more and 450 mPa·s or less.

The prepared cell suspension is dropwise added into a calcium ion-containing solution. In this step, alginic acid is cross-linked and gelated, whereby a liquid droplet in which cells are encapsulated is formed. Examples of the calcium ion-containing solution include a $CaCl_2$ solution. The concentration of the $CaCl_2$ solution is preferably 15 to 120 mM and more preferably 15 to 110 mM. It is sufficient that the dropwise addition is carried out, for example, over about 3 to 30 minutes and preferably 5 to 10 minutes.

It is sufficient that the cell suspension is dropwise added using an encapsulating machine. As the encapsulating machine, an encapsulating device such as Buchi Labortechnik AG or Encapsulator B-395 Pro can be used. The cell suspension can be set in the syringe of the encapsulating machine, extruded from the syringe, and added dropwise. It may be delivered by a perista pump. In the encapsulating device, the cell suspensions, for example, may be subjected to the liquid feeding through a silicone tube to a liquid droplet forming unit or may be subjected to the liquid feeding a microchannel. The liquid droplet formation may be carried out by air cutting or may be carried out by vibration with a voltage.

It is preferable that the formed liquid droplet is further transferred to a liquid containing a polycation to coat the surface thereof. Here, it is sufficient that the above-described polyion complex gel is formed. In the production method of the present invention, as the coating liquid containing the above polycation, a coating liquid containing a calcium ion or barium ion at a concentration of 0.1 mM or more and 50.0 mM or less is used. As shown in Examples below, the inventors of the present invention have found that in a case where a coating liquid containing a calcium ion or a barium ion at the above concentration, it is possible to obtain a uniform microcapsule as compared with a case where a coating liquid containing no calcium ion or barium ion. In the related art (for example, JP1985-258121A (JP-S60-258121A), Transplantation: 62 (7), 888-893, 1996, and the like), the calcium ion was not added to the coating liquid, and thus the above results were surprising. The concentration of the calcium ion or barium ion in the coating liquid is preferably 0.1 mM or more and 20.0 mM or less, and more preferably 0.2 mM or more and 10.0 mM or less. The coating liquid may contain a calcium ion, may contain a barium ion, or may contain both ions; however, it is particularly preferable to contain a calcium ion. As the calcium ion source, it is preferable to use calcium chloride ($CaCl_2$). As the solvent of a solution containing the polycation, it is preferable to use a physiological saline solution or a buffer solution that is generally used for cell treatment.

An amount of 1.0 mL or more of the coating liquid is preferably used for 5,000 liquid droplets. In this range, the liquid droplets are hardly condensed, and thus uniform microcapsules can be obtained. Further, in a case where the amount thereof is set to about 500 mL or less for 5,000 liquid droplets, it is possible to avoid the addition of more amount of the polycation than necessary.

The coating liquid in which liquid droplets are immersed is preferably subjected to shaking treatment.

As described above, it is also preferable to further coat this surface with an alginic acid gel. In a case where the obtained microcapsule is further immersed in a solution containing alginic acid, a microcapsule in which an additional outermost layer shell is formed of alginic acid gel can be obtained. As the coating liquid that is used at this time, a coating liquid having the same alginic acid concentration as that of the above cell suspension may be used, or a coating liquid having an alginic acid concentration lower than this concentration may be used, for example, a coating liquid of about 0.001% by mass to 1.2% by mass may be used. As the solvent, it is preferable to use a physiological saline solution or a buffer solution that is generally used for cell treatment.

The microcapsules obtained by the production method of the present invention are preferably dispersed and stored in a solution containing a calcium ion or barium ion at a concentration of 0.1 mM or more and 50.0 mM or less, and preferably 0.9 mM or more and 45.0 mM or less. In this range, the swelling and the contraction of the formed microcapsule can be prevented.

<Use Application of Microcapsule>

The microcapsule can be used to transplant cells into a recipient. The immune system is known to recognize a shape and a particle size, and a non-uniformly shaped transplant structure can give a rise to the immune system; however, since the microcapsule produced by the production method of the present invention has a uniform shape and particle size, it is hard to stimulate the immune system and is suitable for the use application to transplantation.

The microcapsule may be directly transplanted to the recipient, or may be further encapsulated in, for example, a transplant chamber formed of a porous membrane and transplanted.

The microcapsule can be used, for example, by being transplanted into the abdominal cavity, subcutaneous tissue, peritoneum, or the like. Alternatively, the microcapsule may be administered intravascularly.

The recipient to be subjected to transplantation is preferably a mammal and more preferably a human.

For example, in a case where insulin-secreting cells are used as cells and a donor is present, the donor may be of homologous or may be of heterologous. In a case where the pancreatic islet is used as insulin-secreting cells, the pancreatic islet is preferably of heterologous origin, and in a case where cells are used as insulin-secreting cells, the cells are preferably of homologous origin.

In a case where mesenchymal stem cells are used, the mesenchymal stem cells are preferably mesenchymal stem cells of homologous origin.

The number of times of transplantation may be one time and may be two or more times as necessary.

The microcapsule in which insulin-secreting cells are encapsulated can be used, for example, for the treatment of a disease that requires the insulin-secreting cell transplantation. Examples of the disease that requires the insulin-secreting cell transplantation include diabetes. The diabetes includes type 2 diabetes and type 1 diabetes. In particular, it is conceived that the insulin-secreting cell transplantation is highly effective in the type 1 diabetes.

It is preferable that the number of insulin-secreting cells to be used for the treatment of a disease that requires the insulin-secreting cell transplantation is small. This is because as the number of cells increases, the volume increases, which not only makes transplantation difficult but also increases foreign body sensation after the transplantation.

In a case of using rat-derived pancreatic islets as insulin-secreting cells that are used to normalize the blood glucose level in a diabetic mouse in which diabetes is induced with streptozotocin, it is preferable to use 100 or more and less than 5,000 pancreatic islets, more preferable to use 100 or more and less than 2,500 pancreatic islets, and still more preferable to use 100 or more and less than 1,250 pancreatic islets.

The number of pancreatic islets required to maintain the normal blood glucose level varies between species; however, it is known to be dependent roughly on the body weight.

EXAMPLES

Hereinafter, the characteristics of the present invention will be described more specifically with reference to Examples and Comparative Examples. In Examples below, materials, amounts thereof used, ratios thereof, the details of treatments, treatment procedures, and the like can be suitably modified without departing from the scope of the present invention. Accordingly, the scope of the present invention should not be interpreted restrictively by specific Examples below.

<Preparation of Reagent and the Like>
(MOPS Buffer Solution)

5 mL of a 1 M MOPS solution (Dojindo Molecular Technologies. Inc., 342-06691) was added to 495 mL of a physiological saline solution (1326, Otsuka Pharmaceutical Co., Ltd.) in a safety cabinet (AIRTECH JAPAN, Ltd., BHC-1307 II A2) to prepare a MOPS buffer solution.

(Ca Cross-Linking Liquid)

5 mL of a 1 M MOPS solution (Dojindo Molecular Technologies. Inc., 342-06691) was added to 495 mL of water for injection (Hikari Pharmaceutical Co., Ltd.), and 5.5 g of calcium chloride (FUJIFILM Wako Pure Chemical Corporation, 036-00485) was added thereto and dissolved. The obtained solution was filter sterilized.

(Plasma Simulation Solution)

7.9 g of NaCl (FUJIFILM Wako Pure Chemical Corporation), 0.41 g of KCl (FUJIFILM Wako Pure Chemical Corporation), 0.47 g of $MgCl_2 6H_2O$ (FUJIFILM Wako Pure Chemical Corporation), and 0.30 g of $CaCl_2$ (FUJIFILM Wako Pure Chemical Corporation) are dissolved in 1 L of water for injection (Hikari Pharmaceutical Co., Ltd.). Further, 500 mL of PBS (pH 7.4, Thermo Fisher Scientific, Inc., 10010023) is added. The obtained solution is filter sterilized.

(Ca-Free Plasma Simulation Solution)

7.9 g of NaCl (FUJIFILM Wako Pure Chemical Corporation), 0.41 g of KCl (FUJIFILM Wako Pure Chemical Corporation), and 0.47 g of $MgCl_2 6H_2O$ (FUJIFILM Wako Pure Chemical Corporation) are dissolved in 1 L of water for injection (Hikari Pharmaceutical Co., Ltd.). Further, 500 mL of PBS (pH 7.4, Thermo Fisher Scientific, Inc., 10010023) is added. The obtained solution was filter sterilized.

(Polylysine Coating Liquid)

20 mg of poly-L-lysine hydrobromide (FUJIFILM Wako Pure Chemical Corporation 167-12671) was dissolved in 40 mL of the plasma simulation solution and filter sterilized.

(Polyornithine Coating Liquid)

20 mg of poly-L-ornithine hydrochloride (Sigma-Aldrich Co., LLC, 26982-21-8) is dissolved in 40 mL of the plasma simulation solution and filter sterilized.

(0.03% Alginic Acid Coating Liquid)

A 1.8% alginic acid solution (Buchi Labortechnik AG, 11061528) was diluted with a Ca-free plasma simulation solution to 0.03%.

Capsule Formation Example 1: Microcapsule Containing No Cell

The liquid viscosity at which capsules were normally formed was verified without using cells.

(1) A sodium alginate powder (11059994) manufactured by Buchi Labortechnik AG was dissolved in MOPS buffer solutions so that the concentration thereof were respectively 1.2% by mass, 1.3% by mass, 1.8% by mass, 2.4% by mass, and 2.6% by mass.

(2) As a result of measuring viscosity with EMS-1000 (KYOTO ELECTRONICS MANUFACTURING Co., Ltd.) (sample amount: 400 ul, solution temperature: 25.0° C., rotation speed: 1,000 rpm, measurement time: 5 seconds), the viscosities thereof were respectively 42 mPa·s, 59 mPa·s, 161 mPa·s, 432 mPa·s, and 520 mPa·s.

(3) 1 mL of each liquid was placed in a syringe and set in a microcapsulating device (Encapsulator B-395Pro, nozzle diameter: 400 μm, air dripping). The liquid feeding was carried out at 1.0 mL/min, the dripping with air was carried out at 2.5 L/min, and the liquid was dropwise added to the Ca cross-linking liquid at a nozzle height of 8 cm. At that time, the Ca cross-linking liquid, of which the volume was 100 mL, was stirred at 200 rpm with a magnetic stirrer, and stirring was continued for 7 minutes after the dropwise addition.

Thereafter, the morphology was observed with an optical microscope, and the proportion of the broken capsule and the uniformity of the capsule diameter were evaluated.

(Determination Criteria for Broken Capsule Proportion)

A rating: No broken capsules are confirmed.
B rating: Broken capsules are confirmed, and the number proportion thereof is less than 10%.
C rating: Broken capsules are confirmed, and the number proportion thereof is 10% or more.

(Capsules, One Side of which has a Ruptured Shape, were Counted as Broken Capsules)

(Determination Criteria for Uniformity of Capsule Diameter)

As the evaluation of the uniformity of the capsule diameter, the diameters of 20 capsules were randomly measured from an optical microscopic image.

A rating: The standard deviation of capsule diameters is less than 10% of the average value.
B rating: The standard deviation of capsule diameters is 10% or more and less than 20% of the average value.
C rating: The standard deviation of capsule diameters is 20% or more of the average value.

Figure 1:
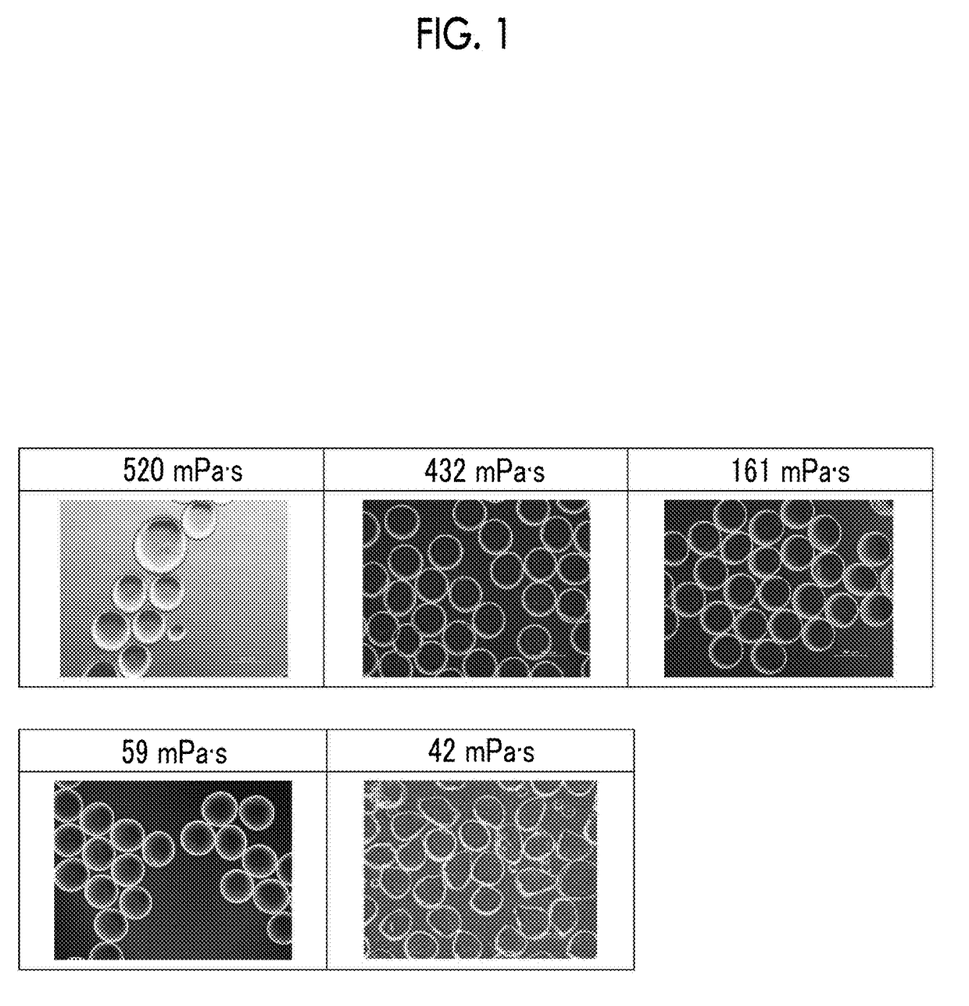
FIG. 1 shows optical microscopic images of microcapsules formed from cell suspensions having viscosities different from each other.

The results are shown in Table 1. An optical microscopic image of microcapsules at each viscosity is shown in FIG. 1.

TABLE 1

| | | | | | |
|---|---|---|---|---|---|
| Alginic acid concentration (% by mass) | 2.6 | 2.4 | 1.8 | 1.3 | 1.2 |
| Cell suspension viscosity (mPa · s) | 520 | 432 | 161 | 59 | 42 |
| Broken capsule proportion | A | A | A | A | C |
| Uniformity of capsule diameter | C | A | A | A | — |

In the range of viscosity of 50 mPa·s or more and 500 mPa·s or less, microcapsules having a uniform diameter were formed without being broken. Based on this result, in the formation example of a microcapsule containing the following cells, a cell suspension of which the viscosity was adjusted in this range was used.

Capsule Formation Example 2: Microcapsule Containing Pancreatic Islet

Capsules in which both the pancreatic islet and Dynabeads M-450 Goat anti-Mouse IgG were encapsulated were produced, and the degree of invasion of the fluorescently labeled antibody IgG derived from a mouse, from the outside, was compared for each capsule to evaluate uniformity.

(1) 350 μL of an alginic acid solution (Buchi Labortechnik AG, 11061528) having such a concentration that the viscosity shown in Table 2 is obtained, was gently mixed in a syringe so that Dynabeads was 15 μg/mL.

(2) 8,200 pancreatic islets (see Dong-Sheng Li. et. al., 2009. Nature Protocol, 4, (11) 1649-1652) extracted from a Lewis Rat were dispersed in 100 μL of the MOPS buffer solution. The dispersed pancreatic islets were gently mixed with 350 μL of the liquid prepared in (1) in a syringe.
(3) The pancreatic islet suspension was placed in a 1 mL syringe and set in an microcapsulating device (Buchi Labortechnik AG, Encapsulator B-395Pro, nozzle diameter: 400 air dripping). The liquid feeding was carried out at 1.0 mL/min, the dripping with air was carried out at 2.5 L/min, and the liquid was dropwise added to the Ca cross-linking liquid at a nozzle height of 8 cm. At that time, the Ca cross-linking liquid, of which the volume was 100 mL, was stirred at 200 rpm with a magnetic stirrer, and stirring was continued for 7 minutes after the dropwise addition.
(4) The Ca cross-linking liquid is filtered using a cell strainer (Falcon 352360) having a mesh diameter of 100 and the capsule is transferred to a polycation coating liquid (the Ca concentration thereof is shown in Table 2) having an amount shown in Table 2. At this time, a sample was prepared by shaking and rotating in a shaking stirrer (AsOne SRR-2) at 70 rpm for 2 minutes. No shaking and rotation were performed only for Example 16 in Table 2.
(5) Thereafter, each of the capsules was washed twice for 1 minute in 45 mL of the plasma simulation solution.
(6) Immersion coating was performed in a 0.03% alginic acid solution (45 mL) for 1 minute.
(7) Washing was carried out once with 45 mL of the plasma simulation solution for 1 minute.
(8) Storing was carried out in the plasma simulation solution (the dispersion liquid) having the Ca concentration as shown in Table 2.

(Evaluation of Antibody Blocking Property)
(1) Capsules were placed one by one in wells of a glass bottom 96-well plate (Nunc) (total volume: 50 μL each).
(2) 2.5 μL of a mouse IgG Alexa 488 (Abcam plc) diluted to 300-folds with the plasma simulation solution was added to each well.
(3) 60 minutes after the mouse IgG Alexa 488 was added, the invasion of the mouse IgG Alexa 488 into the capsule was observed using a fluorescence microscope (KEYENCE Corporation, BZ-X) under the following conditions.
Still image: ×10 lens used
Fluorescence: green, exposure time; 1 s (fading reduction mode)
Dark field/phase difference: exposure time 1/1,000 s
(4) 10 capsules were observed and evaluated by the rate of capsules in which the Dynabeads portion inside the capsules emitted light 30 minutes after the addition of the fluorescent antibody.
A: No light is emitted.
B: One capsule or more and three capsules or less emit light.
C: Four capsules or more emit light.
The results are shown in Table 2.

TABLE 2

|  | Example 1 | Example 2 | Example 3 | Example 4 | Example 5 | Example 6 | Example 7 | Example 8 |
|---|---|---|---|---|---|---|---|---|
| Calcium concentration of 0.05% by weight poly-L-lysine coating liquid (mM) | 0.2 | 2 | 10 | 50 | 2 | 2 | 2 | 2 |
| Liquid amount of 0.05% by weight poly-L-lysine coating liquid for 5,000 capsules (mL) | 30 | 30 | 30 | 30 | 0.9 | 1.1 | 200 | 305 |
| Molecular weight of poly-L-lysine (kDa) | 20 | 20 | 20 | 20 | 20 | 20 | 20 | 20 |
| Cell suspension viscosity (mPa · s) | 160 | 160 | 160 | 160 | 160 | 160 | 160 | 160 |
| Shaking treatment in coating with 0.05% by weight poly-L-lysine | Yes | Yes | Yes | Yes | Yes | Yes | Yes | Yes |
| Calcium concentration of capsule dispersion liquid (mM) | 2.0 | 2.0 | 2.0 | 2.0 | 2.0 | 2.0 | 2.0 | 2.0 |
| Antibody blocking property | A | A | A | B | B | A | A | B |

|  | Example 9 | Example 10 | Example 11 | Example 12 | Example 13 | Example 14 | Example 15 | Example 16 |
|---|---|---|---|---|---|---|---|---|
| Calcium concentration of 0.05% by weight poly-L-lysine coating liquid (mM) | 2 | 2 | 2 | 2 | 2 | 2 | 2 | 2 |
| Liquid amount of 0.05% by weight poly-L-lysine coating liquid for 5,000 capsules (mL) | 30 | 30 | 30 | 30 | 30 | 30 | 30 | 30 |
| Molecular weight of poly-L-lysine (kDa) | 0.5 | 1 | 45 | 150 | 300 | 20 | 20 | 20 |
| Cell suspension viscosity (mPa · s) | 160 | 160 | 160 | 160 | 160 | 59 | 432 | 161 |
| Shaking treatment in coating with 0.05% by weight poly-L-lysine | Yes | Yes | Yes | Yes | Yes | Yes | Yes | No |
| Calcium concentration of capsule dispersion liquid (mM) | 2.0 | 2.0 | 2.0 | 2.0 | 2.0 | 2.0 | 2.0 | 2.0 |
| Antibody blocking property | B | A | A | A | B | A | A | B |

TABLE 2-continued

|  | Example 17 | Example 18 | Example 19 | Example 20 | Example 21 | Comparative Example 1 | Comparative Example 2 |
|---|---|---|---|---|---|---|---|
| Calcium concentration of 0.05% by weight poly-L-lysine coating liquid (mM) | 2 | 2 | 2 | 2 | 2 | 0 | 100 |
| Liquid amount of 0.05% by weight poly-L-lysine coating liquid for 5,000 capsules (mL) | 30 | 30 | 30 | 30 | 30 | 30 | 30 |
| Molecular weight of poly-L-lysine (kDa) | 20 | 20 | 20 | 20 | 20 | 20 | 20 |
| Cell suspension viscosity (mPa · s) | 160 | 160 | 160 | 160 | 160 | 160 | 160 |
| Shaking treatment in coating with 0.05% by weight poly-L-lysine | Yes | Yes | Yes | Yes | Yes | Yes | Yes |
| Calcium concentration of capsule dispersion liquid (mM) | 0.0 | 0.9 | 10.0 | 45 | 100.0 | 2.0 | 2.0 |
| Antibody blocking property | B | A | A | A | B | C | C |

|  | Example 23 |
|---|---|
| Calcium concentration of 0.05% by weight poly-L-lysine coating liquid (mM) | 0.2 |
| Liquid amount of 0.05% by weight poly-L-lysine coating liquid for 5,000 capsules (mL) | 30 |
| Molecular weight of poly-L-lysine (kDa) | 20 |
| Cell suspension viscosity (mPa · s) | 160 |
| Shaking treatment in coating with 0.05% by weight poly-L-lysine | Yes |
| Calcium concentration of capsule dispersion liquid (mM) | 2.0 |
| Antibody blocking property | A |

As can be seen from Table 2, good antibody blocking properties were obtained in Examples containing a calcium ion at a concentration of 0.1 mM or more and 50.0 mM or less. Example 16 was an example in which shaking was not performed when coating with poly-L-lysine was carried out; however, Example 2 which was an equivalent example in which shaking was performed had more uniform antibody blocking properties.

Figure 2:
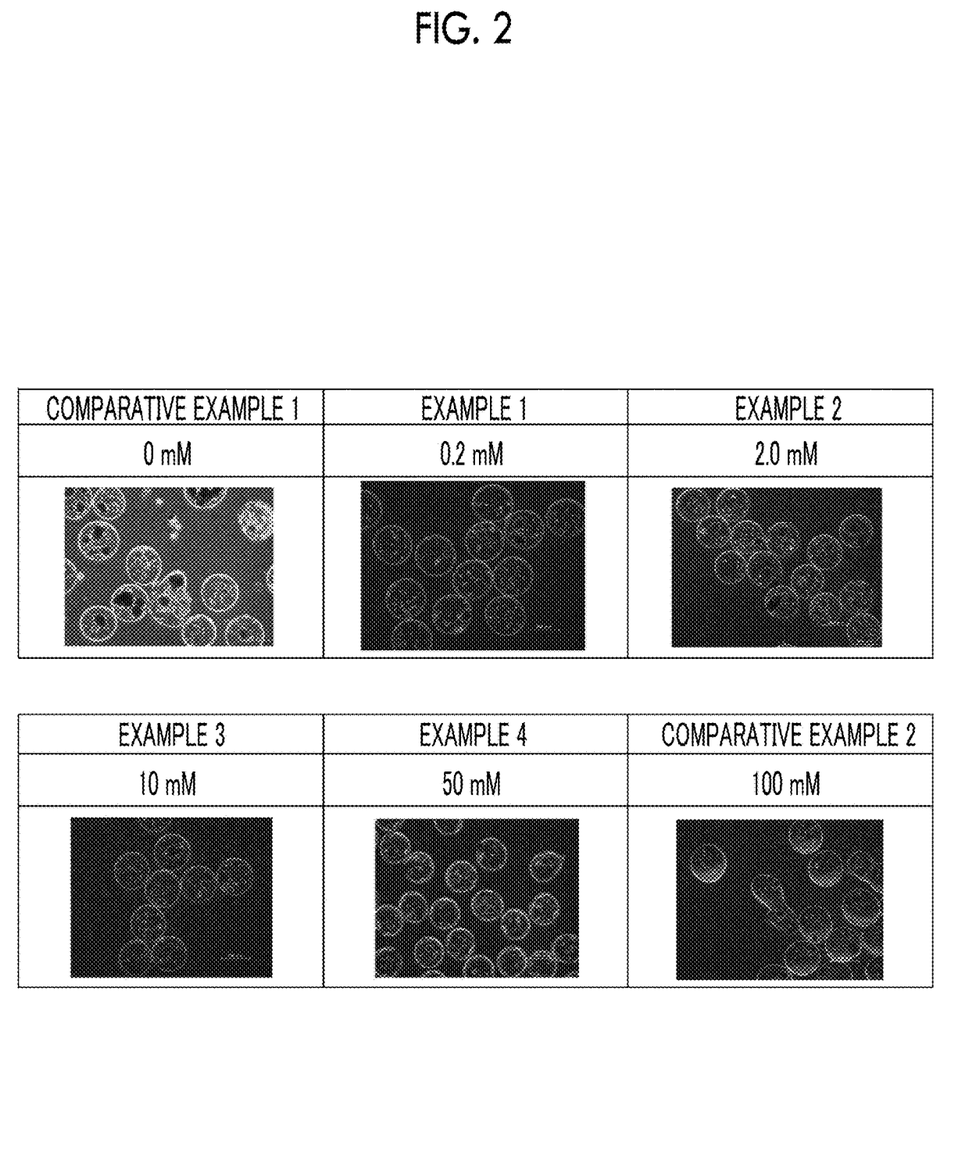
FIG. 2 shows optical microscopic images of microcapsules of Examples 1 to 4 and Comparative Examples 1 and 2, which are formed by using polylysine coating liquids having calcium concentrations different from each other.

In addition, the broken capsule proportions of Examples 1 to 4 and Comparative Examples 1 and 2, having calcium concentrations different from each other in the polylysine coating liquid, were evaluated according to the above criteria. The results are shown in Table 3. In addition, the optical microscopic image of microcapsules of each of Examples and Comparative Examples is shown in FIG. 2.

TABLE 3

|  | Comparative Example 1 | Example 1 | Example 2 | Example 3 | Example 4 | Comparative Example 2 |
|---|---|---|---|---|---|---|
| Calcium concentration of 0.05% by weight poly-L-lysine coating liquid | 0 mM | 0.2 mM | 2.0 mM | 10 mM | 50 mM | 100 mM |
| Broken capsule proportion | C | A | A | A | B | C |

Microcapsules that were hard to be broken and were uniform were obtained in the range in which the calcium concentration in the polylysine coating liquid was 0.1 to 50 mM.

What is claimed is:

1. A production method for a microcapsule in which cells are encapsulated with alginic acid and a polycation, the method comprising:
   dropwise adding a cell suspension containing alginic acid and the cells into a calcium ion-containing solution to obtain a liquid droplet in which the cells are encapsulated with alginic acid; and
   immersing the liquid droplet in a coating liquid containing a polycation to obtain the microcapsule,
   wherein the coating liquid contains a calcium ion or a barium ion at a concentration of 0.1 mM or more and 50.0 mM or less.

2. The production method according to claim 1, wherein the cell suspension has a viscosity of 50 mPa's or more and 500 mPa's or less.

3. The production method according to claim 1, wherein a molecular weight of the polycation is 1 kDa or more and 200 kDa or less.

4. The production method according to claim 1, wherein a molecular weight of the polycation is 1 kDa or more and 50 kDa or less.

5. The production method according to claim 1, wherein the polycation is poly-L-lysine or poly-L-ornithine.

6. The production method according to claim 1, wherein the coating liquid in which the liquid droplet is immersed is subjected to shaking treatment.

7. The production method according to claim 1, further comprising immersing the microcapsule in a solution containing alginic acid.

8. The production method according to claim 7, wherein the microcapsules after being immersed in the solution containing alginic acid are dispersed in a solution containing a calcium ion or a barium ion at a concentration of 0.1 mM or more and 50.0 mM or less.

9. The production method according to claim 1, wherein the cell is a cell that releases a physiologically active substance.

10. The production method according to claim 9, wherein the physiologically active substance is insulin.

11. The production method according to claim 9, wherein the cell is a cell in pancreatic islet.

12. The production method according to claim 9, wherein in the microcapsule, a mesenchymal stem cell or a mesenchymal stem cell group is encapsulated with alginic acid and a polycation together with the cell.

13. The production method according to claim 1, wherein the coating liquid contains a calcium ion or a barium ion at a concentration of 0.1 mM or more and 20.0 mM or less.

14. The production method according to claim 1, wherein the coating liquid contains a calcium ion or a barium ion at a concentration of 0.2 mM or more and 10.0 mM or less.

15. The production method according to claim 1, wherein the coating liquid contains a calcium ion at a concentration of 0.1 mM or more and 50.0 mM or less.

16. The production method according to claim 1, wherein the coating liquid contains a calcium ion at a concentration of 0.1 mM or more and 20.0 mM or less.

17. The production method according to claim 1, wherein the coating liquid contains a calcium ion at a concentration of 0.2 mM or more and 10.0 mM or less.

* * * * *